United States Patent [19]

Waldrop et al.

[11] 3,991,582
[45] Nov. 16, 1976

[54] ROTATING-BUMPER FENDER SYSTEM

[75] Inventors: Tom C. Waldrop; Clarence T. Thomerson, both of Arlington, Tex.

[73] Assignee: Regal Tool and Rubber Company, Arlington, Tex.

[22] Filed: Sept. 24, 1974

[21] Appl. No.: 508,776

[52] U.S. Cl. .................................. 61/48; 114/220; 267/140
[51] Int. Cl.² ..................... E02B 3/22; B63B 21/04; F16F 7/12
[58] Field of Search ............... 114/219, 220; 61/54, 61/48; 267/140

[56] References Cited
UNITED STATES PATENTS

| | | | |
|---|---|---|---|
| 2,420,677 | 5/1947 | Peterson | 61/48 |
| 2,562,957 | 8/1951 | Sipkin et al. | 114/219 |
| 2,655,005 | 10/1953 | Kinneman | 61/48 |
| 2,935,855 | 5/1960 | Reid | 61/48 |
| 3,084,517 | 4/1963 | Bell | 114/220 |
| 3,106,182 | 10/1963 | Burleigh | 114/220 |
| 3,125,979 | 3/1964 | Darling | 114/219 |
| 3,235,244 | 2/1966 | Hein | 114/219 |
| 3,402,558 | 9/1968 | Hellinger | 61/48 |
| 3,462,960 | 8/1969 | Bruehl | 114/219 |
| 3,464,214 | 9/1969 | King | 61/48 |
| 3,564,858 | 2/1971 | Pogonowski | 61/48 |
| 3,828,715 | 8/1974 | Matsushita | 114/219 |
| 3,873,076 | 3/1975 | Evans | 61/48 X |

FOREIGN PATENTS OR APPLICATIONS

| | | | |
|---|---|---|---|
| 187,817 | 2/1964 | Sweden | 114/220 |
| 627,915 | 8/1949 | United Kingdom | 114/219 |

Primary Examiner—Jacob Shapiro
Attorney, Agent, or Firm—Dowell & Dowell

[57] ABSTRACT

A fender system including a supporting frame mounted on a stationary structure by energy-absorbing shock mounting members, and the frame carrying annular bumper members stacked one above the other and sized for rotation about a pipe column, the bumper members each having their respective end surfaces stepped at an annular step in such a way that the stepped surfaces of adjacent bumpers mate and interlock, and the bumper members having multiple relief holes extending in from their end surfaces parallel to the axis of the bumper members and tending to impart a degree of asymmetrical distortion to an impacted bumper member causing it to creep around the pipe column on which it is supported; such rotation being aided by friction reducing means on the surfaces of the bumper members.

7 Claims, 8 Drawing Figures

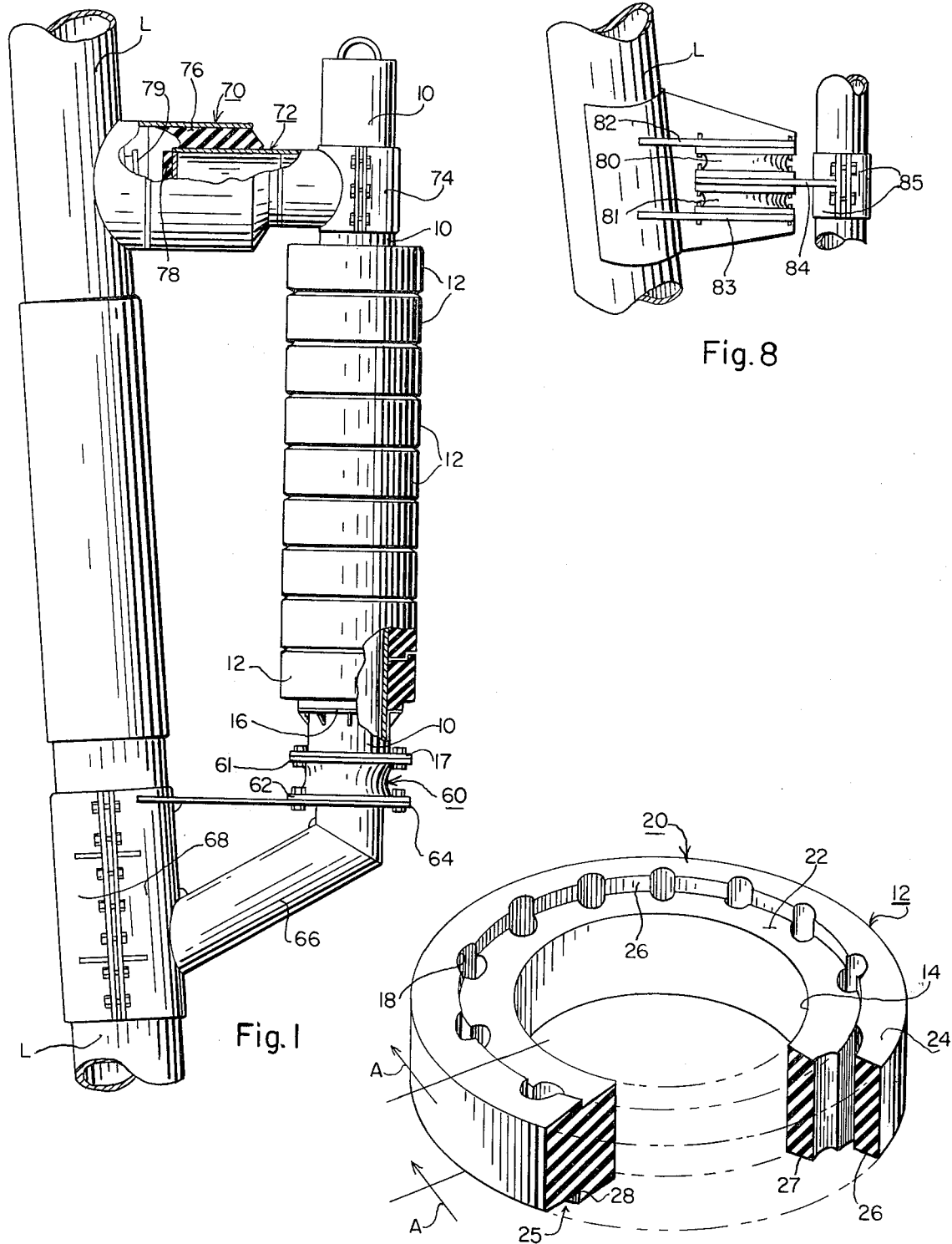

ROTATING-BUMPER FENDER SYSTEM

FIELD OF INVENTION

This invention relates to a fender system for fending off boats and barges landed against a stationary structure to which the fender is attached, and more particularly relates to shock-absorbing fenders for attachment to off-shore platforms, and the like, to protect them from damaging shocks and from the continuous battering attributable to wave-action on vessels tied to the platforms.

BACKGROUND AND PRIOR ART

The off-shore platforms which the present invention is designed to protect are, at best, only semi-rigid structures subject to damage by excessive shock loading. Recently, because of drilling in deeper waters and in more open seas, and because of the use of heavier supply boats and barges, it has become necessary to develop better fendering systems, such systems being generally attached to individual legs of the off-shore platform. In the past, it has been the practice to use cast-off vehicle tires, usually large off-the-road or aircraft tires, mounted on a supporting column next to the platform leg, as shown for instance in U.S. Pat. Nos. Blackman 2,413,210 or Rolando 2,952,979, the latter showing the practice of filling the tires with cable or other material to prevent their excessive sagging or collapse. Some special structures have been built for this purpose, as shown for instance in U.S. Pat. Nos. Roach 3,005,435 and Schwall 2,424,635. However, each has attendant drawbacks. The cast-off vehicle tire systems involve the difficulty of finding a plurality of tires of the same large size, as well as the problems which arise when corded tires become waterlogged and sag. Moreover, deflated vehicle tires exhibit very poor shock absorption capabilities. Inventors such as Schwall, supra, have therefore resorted to making special rubber bumper moldings for this purpose, but his bumpers are mounted in a non-rotating manner and are therefore subject to quick destruction. Roach shows rotating cushions, but the use of axles and bearings provides too fragile a structure to withstand open-sea battering.

THE INVENTION

It is the object of this invention to provide a very rugged and simple fender system providing a maximum of protection for the off-shore platform while still being of reasonable cost.

It is another major object of the invention to provide a fender system using a stacked series of specially shaped bumper members having relief holes set into them in directions parallel to the axis of their mounting and so located as to promote rotation of the bumpers when impacted by a ship which also imparts a component of force tangent to the outer surfaces of the bumpers.

Another important object of the invention is to provide a fender system in which the stacked bumper members are provided with specially selected exposed surface layers designed to improve their resistance to damage, and to improve their tendency to rotate by reducing frictional drag on their supporting column and on each other due to their mutually stacked relationship.

It is a further major object of the invention to provide a fender system using stacked bumper members which are annularly stepped at their end surfaces so that they mate and interlock with each other in such a way as to reduce the tendency of the side of a vessel to separate individual bumper members and extend in between them and perhaps damage the column on which they are supported.

Yet another object of the invention is to provide a bumper supporting frame including the pipe column on which the bumper members are mounted, and including column-mounting shock absorbing members positioned to dissipate major components of the shock applied to the frame, not only including head-on compression forces directed at the platform, but also including lateral components of impact as well. One main object of this invention is to provide a fender system which will absorb and dissipate forces rather than merely attempt to deflect them.

Other objects and advantages of the invention will become apparent during the following discussion of the drawings, wherein:

FIG. 1 is an elevation view, partly in section, showing an illustrative embodiment of the fender system according to the present invention;

FIG. 2 is a perspective view, partly in section, of a cylindrical bumper member according to the invention;

Figure 3:
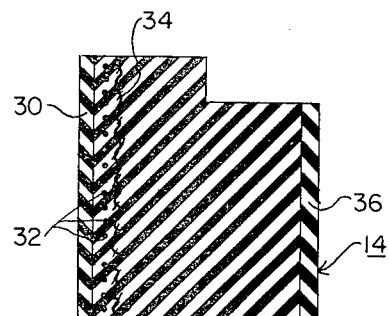
Figure 4:
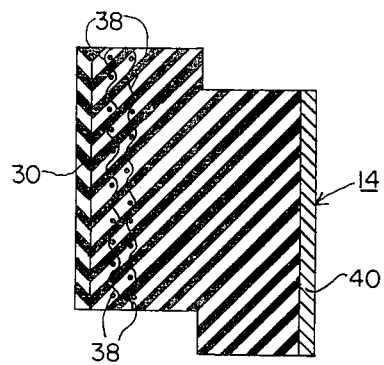
Figure 5:
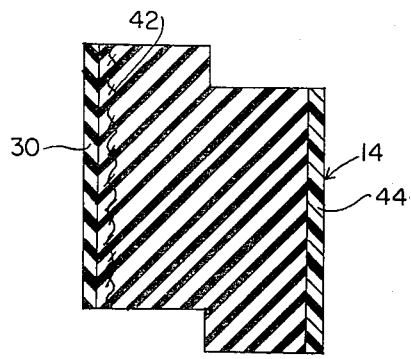
Figure 6:
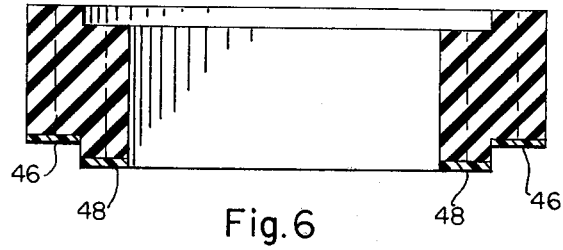
Figure 7:
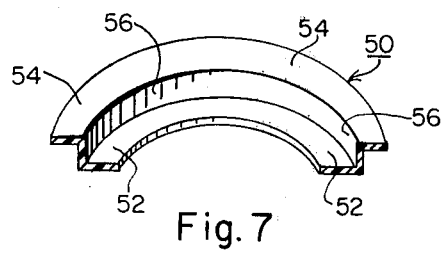

FIGS. 3, 4, and 5 are enlarged cross-section views of various modified forms taken through a bumper member of the type shown in FIG. 2;

FIG. 6 is a sectional view of another modified form of bumper member having a low friction layer on one end surface;

FIG. 7 is a perspective view partly in section showing a friction-reducing disc insertable between adjacent end surfaces of two stacked bumper members; and FIG. 8 is a view partly in section, of an alternate type of shock absorbing mounting member for attaching the bumper supporting column to a platform leg.

A DESCRIPTION OF ILLUSTRATED EMBODIMENTS

Referring now to FIG. 1, a leg L of an off-shore platform (not shown) supports a fender system according to the present invention. The fender system includes a pipe column 10 which supports a stacked series of elastomeric cylindrical bodies 12 surrounding the column 10 and having inner peripheries 14, FIG. 2, loosely fitted thereto so that the bumpers 12 can freely rotate on the column 10. The column has a lower stop plate 16 on which the bottom-most bumper 12 rests, the other bumpers being stacked thereabove. The pipe column 10 is supported on the platform leg L by shock absorbing mounting members that will be described hereinafter.

The multiple bumpers 12 comprise an upper end surface 20 having an inner portion 22 and an outer portion 24 separated from each other by an annular step 26. Likewise, the lower end surface 25 includes an outer portion 26 and an inner portion 27 separated from each other by an annular step 28. These surface portions and the annular steps are so placed that when two bumpers are placed one above the other, they will mate and interlock with their respective inner and outer portions in mutual contact. A series of relief holes 18 extend into the upper and lower end surfaces and pass at least partially through the bumpers, and perhaps all the way through. These holes may be round, or may have some other cross-sectional shape, but they are placed so that the annular steps are located approximately centered on the holes' axes. These holes not only provide some relief areas into which elastomeric material may retreat upon impact from outside, but they also increase the tendency of an impact against the outer surface of a bumper to cause that bumper to rotate. This is because a distorting force can displace elastomeric material from a zone near the annular step in such a way that the material flows asymmetrically into a hole in one direction but stretches in the vicinity of the next preceeding hole. Therefore, as the outer compressive force releases somewhat, the inner portion of the bumper will tend to creep in a circumferential direction around the supporting pipe column 10.

FIG. 3 shows an enlarged sectional view taken at the line A—A in FIG. 2 and illustrating the structure of a bumper having its outer periphery made of a tougher elastomer 30 and having inner filamentary reinforcements including a layer of wires 32 and a layer of fabric 34 inside thereof. In addition, the bumper shown in FIG. 3 also has a harder elastomeric layer 36 lining its inner periphery to make it rotate more readily on the outside surface of the pipe column 10.

FIG. 4 is similar to FIG. 3, except that it is modified to include beneath its outer scuff layer 30 of tougher elastomer two filamentary reinforcement layers 38 of woven wire, and to include on its inner periphery 14 a bonded metallic sleeve 40 intended to rotate more easily against the pipe column 10.

FIG. 5 is still another modification similar to FIG. 3, except that it includes beneath its outer scuff layer 30 of tougher elastomer filamentary fabric reinforcement 42, and includes at its inner periphery 14 a bonded layer 44 of Teflon or other low friction plastic to facilitate rotation of the bumper on the pipe column 10.

FIG. 6 is a half-sectional view of a bumper as shown in FIG. 2 but having a plastic layer on the end surfaces at at least one end of the bumper so as to help the bumper rotate more easily with respect to the next adjacent bumper. These plastic layers comprise an outer layer 46 and an inner layer 48 and may also include a similar layer joining the layers 46 and 48 across the face of the step therebetween.

FIG. 7 is a perspective view, partly in cross-section of a separate low-friction insert 50 made of Teflon or some other low-friction plastic, this insert having inner and outer surface portions 52 and 54 joined by a step portion 56, and shaped to fit snugly in the stack of bumpers between adjacent bumpers to reduce friction of contact between their end surfaces.

The frame which holds the bumpers 12 and includes their supporting column 10 is supported preferably in a resilient manner at its lower end by a shear mount 60 comprising a molded rubber insert bonded to two end plates 61 and 62 and these end plates are in turn bolted respectively to a flange 17 welded to the lower end of the column 10, and to a flange 64 attached to a tubular support 66 held on the platform leg by bolted mounting collar means 68.

At the top of the fender system as shown in FIG. 1, there is a shock absorbing mounting member including telescoping tubular members 70 and 72, the former being welded to the leg L, and the latter carrying a bolted mounting collar 74 which can be easily unbolted to free the top end of the column 10 and permit easy changing of the bumpers 12. The shock member includes an annular rubber cylinder 76 bonded to both tubular members 70 and 72 to absorb and dissipate not only axially directed shocks, but shocks having components acting in other directions. The inner end of the smaller tubular member 72 carries an elastomeric pad 78 which can strike an abutment 79 to limit its travel.

FIG. 8 shows a modified upper mounting member for the fender system comprising two or more shear mounts 80 and 81 similar to the shear mount 60 and carried between spaced plates 82 and 83 rigidly fixed to the platform leg L. The shear mounts 80 and 81 are bolted to the plates 82 and 83 at their outer ends, but they are also bolted to a common plate 84 at their inner ends. The plate 84 is in turn releasably fixed by a bolting collar 85 to the column 10 so that when the collar is unbolted, the column 10 can be freed at its upper end so that the bumpers 12 can be replaced thereon.

This invention is not to be limited to the exact forms shown in the drawings, for obviously changes can be made within the scope of the attached claims.

We claim:

1. A fender system for attachment to a stable structure for fending off vessels such as boats and barges being landed thereadjacent; comprising:
   a. a fender supporting frame attached to said stable structure and including an upright bumper supporting circular cross-section column, said fender supporting frame further including upper and lower mounting members securing said bumper supporting column to the stable structure and the upper and lower members including yieldable shock absorbing members comprising energy absorbing shear mounts having metal plates alternating with layers of molded elastomer bonded thereto; and
   b. a plurality of similar elastomeric bumpers surrounding said upright column in mutually stacked relationship, each bumper comprising a thick wall resilient cylindrical body having end walls and having an inner diameter which is cylindrical and has an inner periphery sized to loosely receive and freely rotate on said column and each inner periphery having an antifriction layer of material harder than the elastomeric body, and each bumper having an outer diameter which is large as compared with the bumper's axial length, and the end walls of the bumpers being disposed so that they mate with the end walls of adjacent bumpers in the stack so as to provide a composite outer bumper surface which is substantially smooth and continuous and cylindrical so as to resist separation of the bumpers upon contact by a vessel.

2. A fender system as set forth in claim 1, wherein said bumpers have annular series of spaced relief holes, each hole extending in an axial direction from one end wall into the body toward the other end wall.

3. A fender system as set forth in claim 1, wherein each of said bumpers has an outer peripheral surface comprising a layer of material having greater resistance to tearing than said elastomeric body material.

4. A fender system as set forth in claim 3, wherein each of said bumpers has at least one layer of filamentary reinforcement near its outer periphery and beneath its outer layer.

5. A fender system as set forth in claim 4, wherein said filamentary reinforcement includes wire reinforcements.

6. A fender system as set forth in claim 1, wherein said lower mounting member comprises an energy absorbing shear mount comprising spaced metal plates with molded elastomer therebetween and bonded thereto, and wherein said upper mounting member comprises concentric metal tubular members respectively attached to said column and to said stable structure, and elastomeric material molded to occupy a space between said tubular members and bonded thereto, and a padded stop on the end of the inner tubular member to limit its travel when displaced into the outer tubular member.

7. A fender system as set forth in claim 1, including friction reducing discs of low-friction material interposed between the end surfaces of adjacent bumpers in a stack.

* * * * *